(12) United States Patent
Yoshihara et al.

(10) Patent No.: US 8,044,901 B2
(45) Date of Patent: Oct. 25, 2011

(54) LIQUID CRYSTAL DISPLAY DEVICE HAVING SPONTANEOUS POLARIZATION

(75) Inventors: Toshiaki Yoshihara, Kawasaki (JP); Tetsuya Makino, Kakogawa (JP); Shinji Tadaki, Kawasaki (JP); Hironori Shiroto, Kobe (JP); Yoshinori Kiyota, Kawasaki (JP); Keiichi Betsui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 754 days.

(21) Appl. No.: 11/975,081

(22) Filed: Oct. 17, 2007

(65) Prior Publication Data

US 2008/0043178 A1 Feb. 21, 2008

Related U.S. Application Data

(63) Continuation of application No. PCT/JP2005/007410, filed on Apr. 18, 2005.

(51) Int. Cl.
*G09G 3/36* (2006.01)
*G02F 1/141* (2006.01)

(52) U.S. Cl. .......................................... 345/87; 349/72

(58) Field of Classification Search .................... 345/87, 345/102; 349/171, 172, 34
See application file for complete search history.

(56) References Cited

U.S. PATENT DOCUMENTS

| | | | |
|---|---|---|---|
| 5,724,116 A | 3/1998 | Suzuki | |
| 6,046,790 A * | 4/2000 | Hara et al. | 349/172 |
| 6,177,968 B1 | 1/2001 | Okada et al. | |
| 6,417,828 B1 | 7/2002 | Sato et al. | |
| 6,573,970 B1 * | 6/2003 | Saitoh et al. | 349/172 |
| 6,600,544 B2 | 7/2003 | Yoshihara et al. | |
| 6,636,193 B1 | 10/2003 | Asao et al. | |
| 6,667,795 B2 | 12/2003 | Shigemura | |
| 6,873,311 B2 | 3/2005 | Yoshihara et al. | |
| 6,888,610 B2 | 5/2005 | Yoshihara et al. | |
| 2002/0149576 A1 * | 10/2002 | Tanaka et al. | 345/204 |
| 2003/0011739 A1 | 1/2003 | Yoshihara et al. | |
| 2003/0156243 A1 | 8/2003 | Yoshihara et al. | |
| 2008/0043178 A1 | 2/2008 | Yoshihara et al. | |
| 2008/0303990 A1 | 12/2008 | Yoshihara et al. | |

FOREIGN PATENT DOCUMENTS

JP 11-119189 4/1999

(Continued)

OTHER PUBLICATIONS

Mochizuki, A., et al., "Zigzag Defect Free Alignment and Good Bistability of Surface Stabilized $S_c^*$ Cells.", Ferroelectrics, 1991, vol. 113, pp. 353-359.

(Continued)

*Primary Examiner* — Kevin M Nguyen
(74) *Attorney, Agent, or Firm* — Greer, Burns & Crain, Ltd.

(57) ABSTRACT

When the applied voltages are 7 V and 5 V, a transmittance of equal to or more than 50% is obtained when conditions of |2Ps·A|≦|7Clc·A| and |2Ps·A|≦|5Clc·A| are satisfied among the magnitude Ps (nC/cm²) of the spontaneous polarization per unit area of the liquid crystal material, the electrode area A (cm²) of the pixels and the capacity of liquid crystal Clc (nF/cm²) per unit area, and a transmittance of equal to or more than 80% is obtained when conditions of |2Ps·A|≦|4.5Clc·A| and |2Ps·A|≦|3Clc·A| are satisfied thereamong. A sufficiently high transmittance is obtained without the provision of a storage capacitor.

22 Claims, 11 Drawing Sheets

FOREIGN PATENT DOCUMENTS

| | | |
|---|---|---|
| JP | 2000-19562 | 1/2000 |
| JP | 2001-100257 | 4/2001 |
| JP | 2003-029237 | 1/2003 |

OTHER PUBLICATIONS

Office Action dated Jan. 6, 2010 for U.S. Appl. No. 11/975,020, filed Oct. 17, 2007.

Yoshihara et al.; "A Full-Color Video Rate FLC Display Based on Time Domain Color Switching with a TFT Array"; 17th Int'l. Liquid Crystal Conf.; p. 25, p. 1-74; Jul. 19-24, 1998.

Yoshihara et al; "A Full-Color FLC Display Based on Field Sequential Color with TFTs"; AM-LCD; '99 Digest of Technical Papers, p. 185; Jul. 14-16, 1999.

Yoshihara et al; "Invited Paper: A 254-ppi Full-Color Video Rate TFT-LCD Based on Field Sequential Color and FLC Display"; SID '00 Digest of Technical Papers; p. 1176; May 2000.

Office Action issued by the United States Patent and Trademark Office for U.S. Appl. No. 11/975,020, mailed May 15, 2009.

\* cited by examiner

F I G. 8
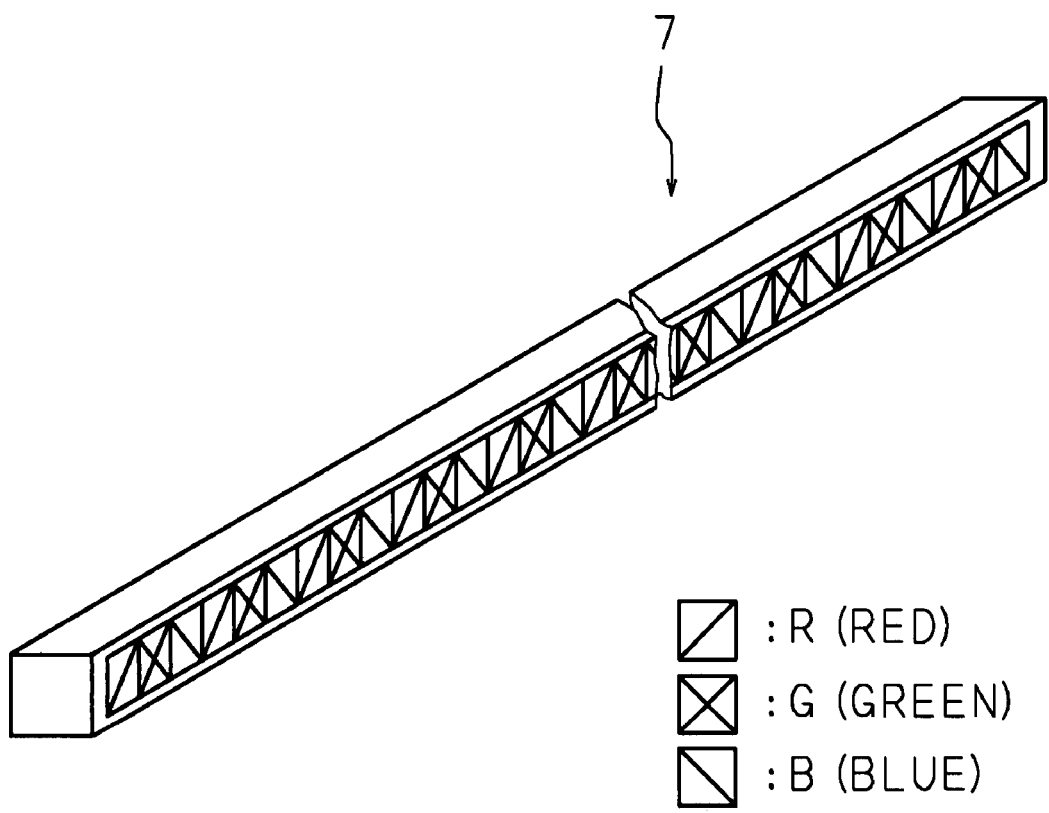
☐ : R (RED)
☒ : G (GREEN)
☐ : B (BLUE)

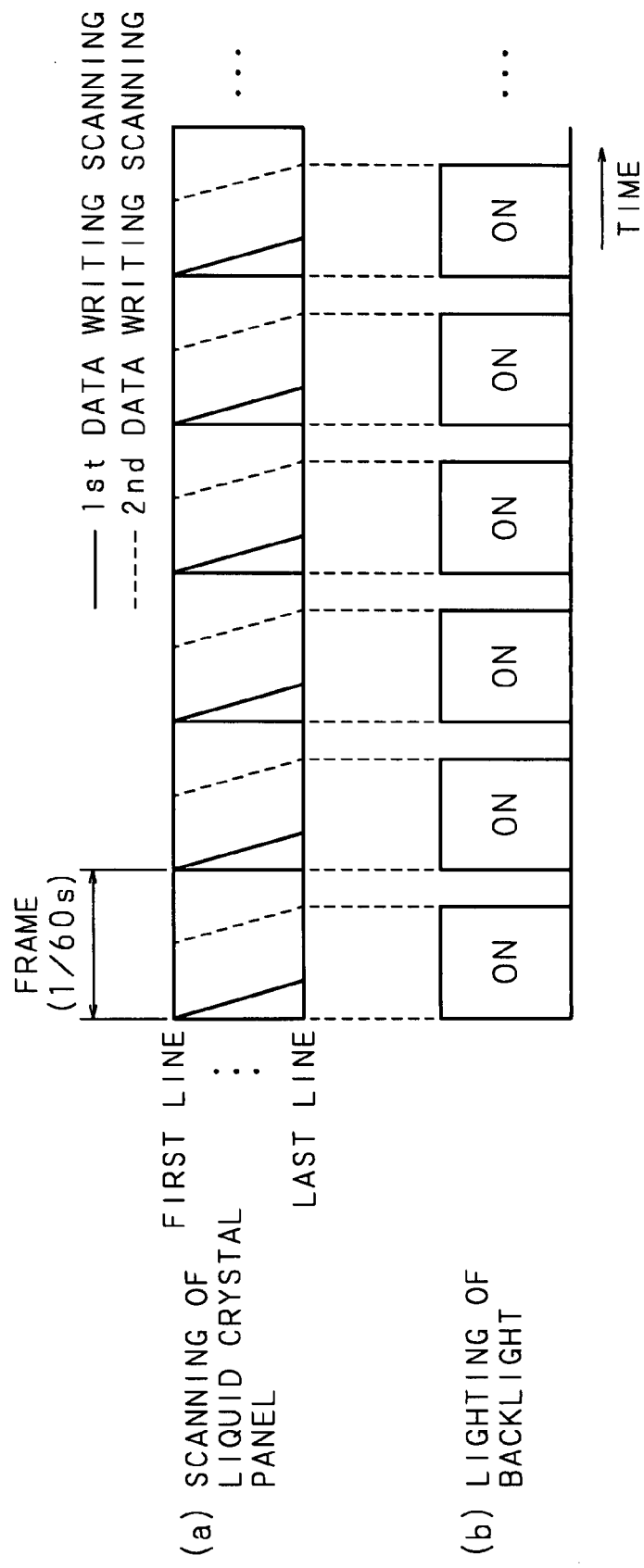

LIQUID CRYSTAL DISPLAY DEVICE HAVING SPONTANEOUS POLARIZATION

This application is a continuation of PCT International Application No. PCT/JP2005/007410 which has an International filing date of Apr. 18, 2005, which designated the United States of America.

TECHNICAL FIELD

The present invention relates to a liquid crystal display device, and more particularly, to an active matrix driven liquid crystal display device using a liquid crystal material having spontaneous polarization.

BACKGROUND ART

With the recent progression of the so-called information-oriented society, electronic apparatuses typified by personal computers and PDAs (personal digital assistants) have come to be widely used. The spread of such electronic apparatuses has produced a demand for portable apparatuses that can be used both in offices and outdoors, and such apparatuses are required to be reduced in size and weight. As a means of achieving this object, liquid crystal display devices are widely used. Liquid crystal display devices are an indispensable technology not only for the reduction in size and weight but also for the reduction in the power consumption of battery driven portable electronic apparatuses.

Liquid crystal display devices are broadly classified into a reflective type and a transmissive type. The reflective type has a structure in which the light incident from the front surface of the liquid crystal panel is reflected at the back surface of the liquid crystal panel and the image is made visually seen by means of the reflected light. The transmissive type has a structure in which the image is made visually seen by means of the transmitted light from a light source (backlight) provided on the back surface of the liquid crystal panel. Since the reflective type in which the amount of reflected light varies depending on the environmental condition is inferior in viewability, transmissive type color liquid crystal display devices using color filters are generally used as display devices, particularly, for personal computers and the like that perform multi-color or full-color display.

At present, active driven type liquid crystal display devices using switching elements such as TFTs (thin film transistors) are widely used as color liquid crystal display devices. In the TFT driven liquid crystal display devices, although the display quality is high, since the light transmittance of the liquid crystal panel is only approximately several percents under present circumstances, a high-brightness backlight is necessary to obtain high screen brightness. For this reason, the power consumption of the backlight is increased. In addition, since color filters are used for color display, one pixel is necessarily formed of three subpixels, so that high resolution is difficult to achieve and the display color purity is insufficient.

To solve this problem, the present inventor et al. have developed field sequential type liquid crystal display devices (see, for example, Non-Patent Documents 1, 2 and 3). In the field sequential type liquid display devices, compared with the color filter type liquid crystal display devices, since no subpixel is required, higher-resolution display can be easily realized, and since the luminous colors of the light source can be used for display as they are without the use of color filters, the display color purity is excellent. Further, since light use efficiency is high, power consumption is low. However, to realize the field sequential type liquid crystal display devices, it is essential that the liquid crystal have a fast responsivity (equal to or less than 2 ms).

Accordingly, to achieve a fast responsivity in the field sequential type liquid crystal display devices having excellent advantages as mentioned above or the color filter type liquid crystal display devices, the present inventor et al. have researched and developed the driving of a liquid crystal such as a ferroelectric liquid crystal having spontaneous polarization from which a fast responsivity 100 to 1000 times that of conventional devices can be expected, by switching elements such as TFTs (see, for example, Patent Document 1). In the ferroelectric liquid crystal, the direction of major axis of the liquid crystal molecules tilts by voltage application. A liquid crystal panel holding the ferroelectric liquid crystal is sandwiched between two polarizers the polarization axes of which are orthogonal to each other, and the transmitted light intensity is changed by using the birefringence caused by the change of the major axis direction of the liquid crystal molecules.

[Patent Document 1] Japanese Patent Application Laid-Open No. H11-119189

[Non-Patent Document 1] T. Yoshihara et al., ILCC 98, P1-074, issued in 1998

[Non-Patent Document 2] T. Yoshihara et al., AM-LCD'99 Digest of Technical Papers, p. 185, issued in 1999

[Non-Patent Document 3] T. Yoshihara et al., SID'00 Digest of Technical Papers, p. 1176, issued in 2000

DISCLOSURE OF THE INVENTION

Problems to be Solved by the Invention

Although the field sequential type liquid crystal devices have advantages that light use efficiency is high and that power consumption can be reduced, to mount them on portable apparatuses, further reduction in power consumption is required. The reduction in power consumption is required not only of the field sequential type liquid crystal display devices but also of the color filter type liquid crystal display devices.

FIG. 1 is a schematic plan view of a conventional liquid crystal panel. As shown in FIG. 1, pixel electrodes 40 and TFTs 41 are arranged in matrix on a glass substrate 4, and the pixel electrodes 40 are connected to the drain terminals of the TFTs 41. The source terminals of the TFTs 41 are connected to signal lines 42 drawn from a data driver 32, and the gate terminals of the TFTs 41 are connected to scanning lines 43 drawn from a scan driver 33. A storage capacitor 80 is provided in each pixel so as to be parallel to the pixel electrode 40 (capacity of liquid crystal).

In the liquid crystal display devices using a liquid crystal material having spontaneous polarization, since a large amount of charge is required for the switching of the liquid crystal, the storage capacitor 80 for storing charge is typically provided in each pixel. To further reduce power consumption, it is effective to further increase the aperture ratio of the liquid crystal panel to thereby increase transmittance. However, since it is necessary to provide the storage capacitor 80 in each pixel, the aperture ratio of the liquid crystal panel cannot be increased.

In addition, since the provision of the storage capacitor 80 increases the capacity of each pixel, the load on the switching elements (TFTs 41) and the driving circuits (the data driver 32 and the scan driver 33) is heavy. Therefore, the development of a liquid crystal display device requiring no storage capacitor is demanded.

The present invention is made in view of such circumstances, and an object thereof is to provide an active matrix driven liquid crystal display device using a liquid crystal material having spontaneous polarization in which a sufficient transmittance is obtained and excellent display can be provided without the provision of a storage capacitor.

Means for Solving the Problems

A liquid crystal display device according to a first aspect is an active matrix driven liquid crystal display device having a liquid crystal cell in which a liquid crystal material having spontaneous polarization is sealed, wherein a magnitude Ps (nC/cm$^2$) of the spontaneous polarization per unit area of the liquid crystal material satisfies a condition of $|2Ps \cdot A| \leq |k \cdot Clc \cdot A|$, and no storage capacitor is provided, where A (cm$^2$) is an electrode area of a pixel, Clc (nF/cm$^2$) is a capacity of liquid crystal per unit area, and k is a magnitude of a voltage applied to the liquid crystal cell.

In the liquid crystal display according to the first aspect, a liquid crystal material satisfying the condition of $|2Ps \cdot A| \leq |k \cdot Clc \cdot A|$ is used where Ps (nC/cm$^2$) is the magnitude of the spontaneous polarization per unit area of the liquid crystal material, A (cm$^2$) is the electrode area of the pixel, Clc (nF/cm$^2$) is the capacity of liquid crystal per unit area and k is the magnitude of the voltage applied to the liquid crystal cell. Therefore, since the transmittance in the liquid crystal part can be increased without the provision of a storage capacitor, excellent display can be provided. Consequently, no storage capacitor is required, and since this makes it possible to increase the aperture ratio of the liquid crystal panel, the transmittance can be improved.

In a liquid crystal display device according to a second aspect, when the magnitude of the voltage applied to the liquid crystal cell is 7 V, the magnitude Ps of the spontaneous polarization per unit area of the liquid crystal material is equal to or less than approximately 11 nC/cm$^2$.

In the liquid crystal display device according to the second aspect, when the voltage applied to the liquid crystal cell is 7 V, a liquid crystal material the magnitude Ps of the spontaneous polarization per unit area of which is equal to or less than approximately 11 nC/cm$^2$ is used. Consequently, the condition in the first aspect can be easily satisfied.

In a liquid crystal display device according to a third aspect, when the magnitude of the voltage applied to the liquid crystal cell is 5 V, the magnitude Ps of the spontaneous polarization per unit area of the liquid crystal material is equal to or less than approximately 8 nC/cm$^2$.

In the liquid crystal display device according to the third aspect, when the voltage applied to the liquid crystal cell is 5 V, a liquid crystal material the magnitude Ps of the spontaneous polarization per unit area of which is equal to or less than approximately 8 nC/cm$^2$ is used. Consequently, the condition in the first aspect can be easily satisfied.

A liquid crystal display device according to a fourth aspect is an active matrix driven liquid crystal display device having a liquid crystal cell in which a liquid crystal material having spontaneous polarization is sealed, wherein a magnitude Ps (nC/cm$^2$) of the spontaneous polarization per unit area of the liquid crystal material satisfies a condition of $|2Ps \cdot A| \leq |0.6 \cdot k \cdot Clc \cdot A|$, and no storage capacitor is provided, where A (cm$^2$) is an electrode area of a pixel, Clc (nF/cm$^2$) is a capacity of liquid crystal per unit area, and k is a magnitude of a voltage applied to the liquid crystal cell.

In the liquid crystal display device according to the fourth aspect, a liquid crystal material satisfying the condition of $|2Ps \cdot A| \leq |0.6 \cdot k \cdot Clc \cdot A|$ is used where Ps (nC/cm$^2$) is the magnitude of the spontaneous polarization per unit area of the liquid crystal material, A (cm$^2$) is the electrode area of the pixel, Clc (nF/cm$^2$) is the capacity of liquid crystal per unit area and k is the magnitude of the voltage applied to the liquid crystal cell. Therefore, since the transmittance in the liquid crystal part can be increased without the provision of a storage capacitor, excellent display can be provided. Consequently, no storage capacitor is required and since this makes it possible to increase the aperture ratio of the liquid crystal panel, the transmittance can be improved. In addition, compared with the first aspect, the transmittance in the liquid crystal part can be more increased, so that the transmittance as the liquid crystal panel can also be more improved.

In a liquid crystal display device according to a fifth aspect, when the magnitude of the voltage applied to the liquid crystal cell is 7 V, the magnitude Ps of the spontaneous polarization per unit area of the liquid crystal material is equal to or less than approximately 7 nC/cm$^2$.

In the liquid crystal display device according to the fifth aspect, when the voltage applied to the liquid crystal cell is 7 V, a liquid crystal material the magnitude Ps of the spontaneous polarization per unit area of which is equal to or less than approximately 7 nC/cm$^2$ is used. Consequently, the condition in the fourth aspect can be easily satisfied.

In a liquid crystal display device according to a sixth aspect, when the magnitude of the voltage applied to the liquid crystal cell is 5 V, the magnitude Ps of the spontaneous polarization per unit area of the liquid crystal material is equal to or less than approximately 4.5 nC/cm$^2$.

In the liquid crystal display device according to the sixth aspect, when the voltage applied to the liquid crystal cell is 5 V, a liquid crystal material the magnitude Ps of the spontaneous polarization per unit area of which is equal to or less than approximately 4.5 nC/cm$^2$ is used. Consequently, the condition in the fourth aspect can be easily satisfied.

In a liquid crystal display device according to a seventh aspect, a scanning time of each line in data writing scanning is a time during which the liquid crystal hardly makes a response and a change in transmittance hardly occurs.

In the liquid crystal display device according to the seventh aspect, by thus setting the scanning time of each line, the active matrix driving, of the liquid crystal material having spontaneous polarization, using switching elements such as TFTs can be stably performed. Generally, when a response of the liquid crystal material having spontaneous polarization occurs within the scanning time (gate on) of each line, since there is a difference in the charge consumption by the liquid crystal at the time of gate off between when a positive voltage is applied and when a negative voltage is applied, image sticking of the display occurs. This can be prevented in the seventh aspect.

In a liquid crystal display device according to an eighth aspect, the scanning time of each line is equal to or less than 5 μs/line.

In the liquid crystal display device according to the eighth aspect, the scanning time of each line is equal to or less than 5 μs/line. Consequently, stable driving can be performed with little electric field response of liquid crystal being caused within the scanning time. Moreover, display of a large capacity of equal to or more than 560 scanning lines can also be provided by the field sequential method requiring high-speed scanning.

The liquid crystal display device of the present invention performs color display by the field sequential method that sequentially switches the lights of a plurality of colors. Consequently, the color display with high-resolution, high-color-purity and rapid-response can be achieved.

The liquid crystal display device of the present invention performs color display by the color filter method using color filters. Consequently, color display can be easily performed.

The liquid crystal display device of the present invention uses a light emitting diode as the light source for display. Consequently, switching between the turning on and off of the light source can be easily made, and display color purity is improved.

Effects of the Invention

According to the present invention, in the active matrix driven liquid crystal display device using the liquid crystal material having spontaneous polarization, since it is unnecessary to provide a storage capacitor, the aperture ratio of the liquid crystal panel can be increased. Consequently, light use efficiency is increased, so that power consumption can be reduced.

BRIEF DESCRIPTION OF THE DRAWINGS

FIG. 8 is a schematic view showing an example of the structure of an LED array;

FIG. 11 is a view showing an example of the driving sequence in the color filter type liquid crystal display device.

DESCRIPTION OF THE NUMERALS

Figure 1:
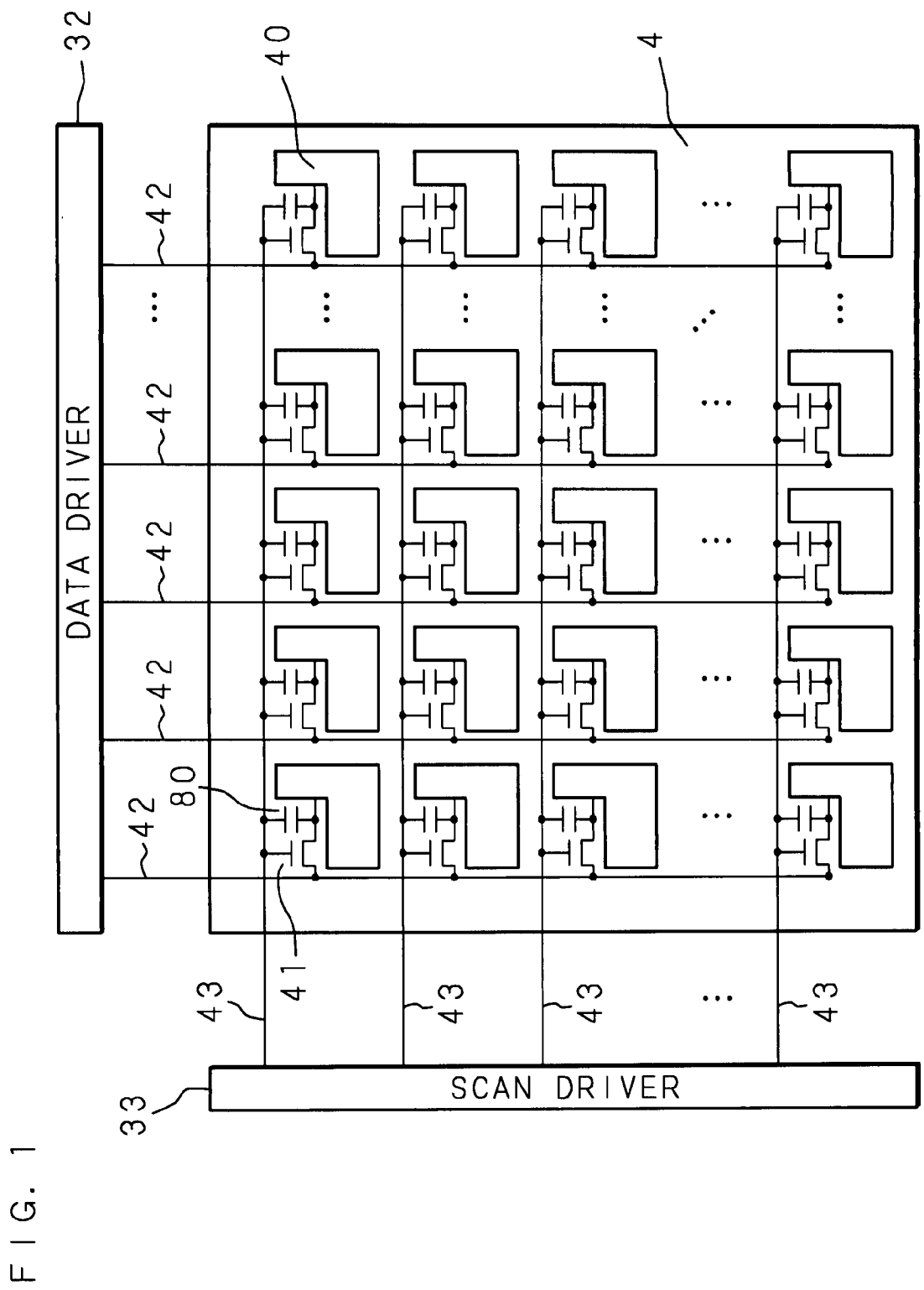
FIG. 1 is a schematic plan view of the conventional liquid crystal panel.

7 LED array
13 liquid crystal layer
21 liquid crystal panel
22 backlight
32 data driver
33 scan driver
40 pixel electrode
41 TFT
42 signal line
43 scanning line

BEST MODES FOR IMPLEMENTING THE INVENTION

In an active matrix driven liquid crystal display device using a liquid crystal material having spontaneous polarization according to the present invention, by using a liquid crystal material satisfying a condition of $|2Ps \cdot A| \leq |k \cdot Clc \cdot A|$ where Ps ($nC/cm^2$) is the magnitude of the spontaneous polarization per unit area of the liquid crystal material, A ($cm^2$) is the electrode area of the pixel, Clc ($nF/cm^2$) is the capacity of liquid crystal per unit area and k is the positive constant that is set in accordance with the applied voltage, a sufficient transmittance can be realized and excellent display can be provided even when no storage capacitor is provided. First, the value of k defined based on the test performed by the present inventor will be described in the following:

After glass substrates having transparent electrodes (electrode area: 1 $cm^2$) made of ITO (indium tin oxide) were cleaned, polyimide was applied thereto and baked at 200° C. for one hour to thereby form polyimide films of approximately 200 Å. The surfaces of these films were rubbed with a rayon cloth, the two glass substrates were placed one on another so that the rubbing directions were parallel to each other, and spacers made of silica were provided between the glass substrates to hold a gap, whereby an empty panel with a gap of 1.8 μm was formed.

Ten kinds (Samples 1 to 10) of ferroelectric liquid crystal materials as shown in Table 1 shown below were each sealed in the empty panel and sandwiched between two polarizers in the crossed nicols state, whereby ten liquid crystal panels were formed. When a liquid crystal material having spontaneous polarization is used, the relative dielectric constant and the capacity of liquid crystal (Clc) exhibit frequency dependence because of the influence of the spontaneous polarization. Therefore, in the present invention, to suppress the influence of spontaneous polarization, the relative dielectric constant and the capacity of liquid crystal are values at a frequency of 10 kHz.

TABLE 1

| Sample No. | Magnitude of spontaneous polarization × 2 2Ps ($nC/cm^2$) | Relative dielectric constant | Capacity of liquid crystal Clc ($nF/cm^2$) |
|---|---|---|---|
| Sample 1 | 26.5 | 6.3 | 3.1 |
| Sample 2 | 28.5 | 6.6 | 3.3 |
| Sample 3 | 7.7 | 5.9 | 2.9 |
| Sample 4 | 14.9 | 5.9 | 2.9 |
| Sample 5 | 15.7 | 6.1 | 3.0 |
| Sample 6 | 10.6 | 5.9 | 2.9 |
| Sample 7 | 13.3 | 6.6 | 3.2 |
| Sample 8 | 14.0 | 6.5 | 3.2 |
| Sample 9 | 12.5 | 6.3 | 3.1 |
| Sample 10 | 20.5 | 6.0 | 3.0 |

Then, TFTs were connected to the formed ten liquid crystal panels, and the transmittance when a voltage was applied to the liquid crystal was measured. In this case, no storage capacitor was provided. The transmittance was obtained by measuring the transmitted light intensity in 2.8 ms from the gate on when voltages of ±5V and ±7V were applied with the gate on time being 5 μs and the interval being 2.8 ms. A transmittance of 100% was the transmitted light intensity in the parallel nicols state. The measurement results for the liquid crystal panels using the Samples 1 to 10 are shown in FIG. 2.

In color filter type liquid crystal display devices, even when the transmittance of the liquid crystal is 100%, since the color filters reduce the transmittance to ⅓, the transmittance is 33.3%. In the case of field sequential type liquid crystal display devices, since no color filter is required, even when the transmittance of the liquid crystal is 50%, a transmittance 1.5 times that of color filter type liquid crystal display devices can be achieved. Therefore, in the present invention, 50% is defined as the transmittance sufficient for display, and 80% is defined as the more sufficient transmittance.

Figure 2:
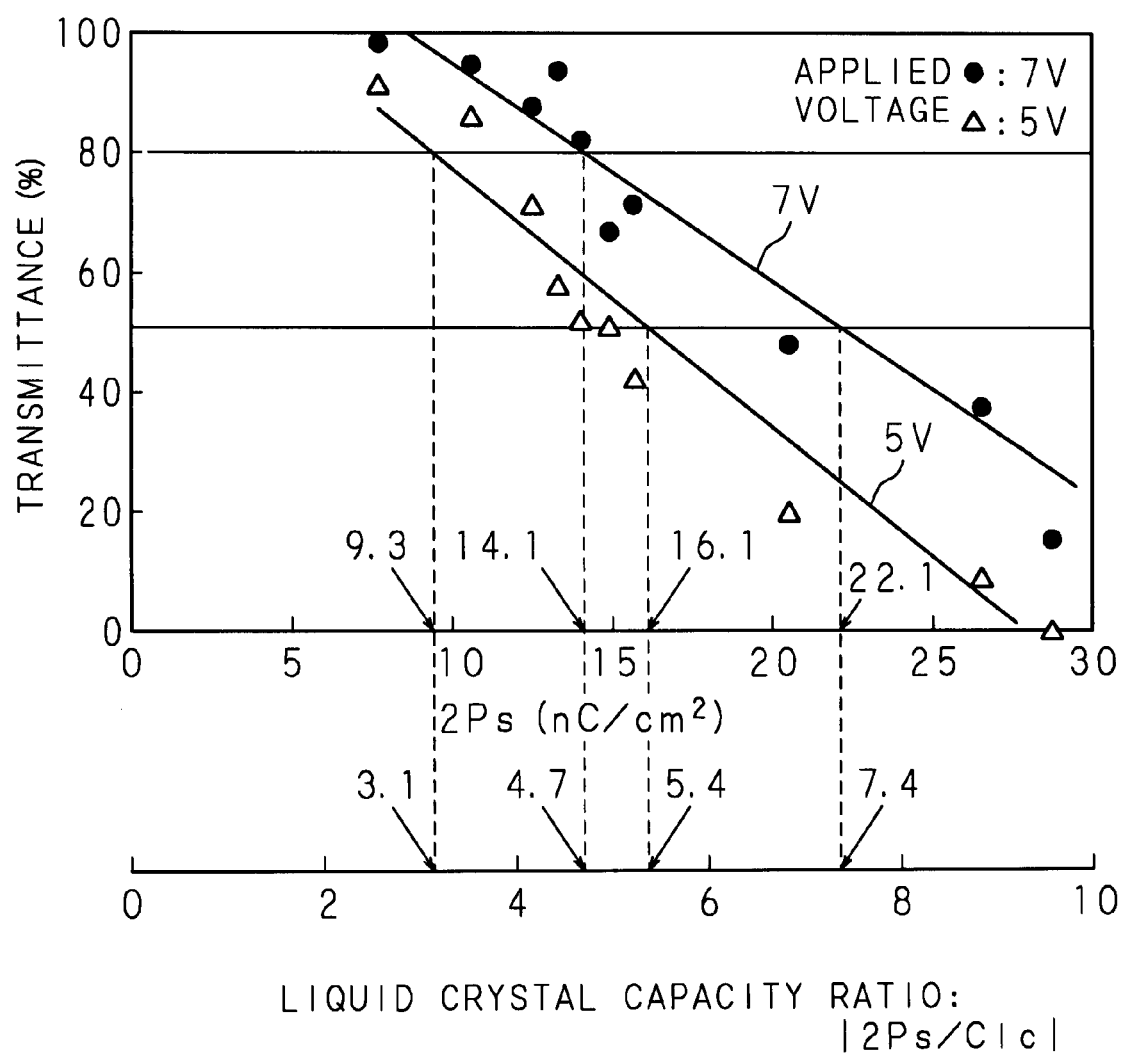
FIG. 2 is a graph showing a relation between the ratio (|2Ps/Clc|) of the magnitude of the spontaneous polarization of the liquid crystal material to the capacity of liquid crystal, and the transmittance.

When the applied voltage shown at ● in FIG. 2 is 7 V, it is apparent that to achieve a transmittance of equal to or more than 50%, a condition of $|2Ps \cdot A| \leq |7Clc \cdot A|$ is satisfied among the magnitude Ps ($nC/cm^2$) of the spontaneous polarization per unit area of the liquid crystal material, the electrode area A ($cm^2$) of the pixel and the capacity of liquid crystal Clc ($nF/cm^2$) per unit area. In this case, the magnitude Ps of the spontaneous polarization is equal to or less than 11 $nC/cm^2$. It is also apparent that to achieve a transmittance of equal to or more than 80%, a condition of $|2Ps \cdot A| \leq |4.5Clc \cdot A|$ is satisfied. In this case, the magnitude Ps of the spontaneous polarization is equal to or less than 7 $nC/cm^2$.

Likewise, when the applied voltage shown at Δ in FIG. 2 is 5 V, it is apparent that to achieve a transmittance of equal to or more than 50%, a condition of $|2Ps \cdot A| \leq |5Clc \cdot A|$ is satisfied. In this case, the magnitude Ps of the spontaneous polarization is equal to or less than 8 $nC/cm^2$. It is also apparent that to achieve a transmittance of equal to or more than 80%, a condition of $|2Ps \cdot A| \leq |3Clc \cdot A|$ is satisfied. In this case, the magnitude Ps of the spontaneous polarization is equal to or less than 4.5 $nC/cm^2$.

While the voltages applied to the liquid crystal are 7V and 5V in the above-described example, generally, by satisfying a condition of $|2Ps \cdot A| \leq |k \cdot Clc \cdot A|$ by using the positive constant k that is set in accordance with the voltage applied to the liquid crystal, a transmittance of equal to or more than 50% or a transmittance of equal to or more than 80% can be achieved without the provision of a storage capacitor.

Figure 3:
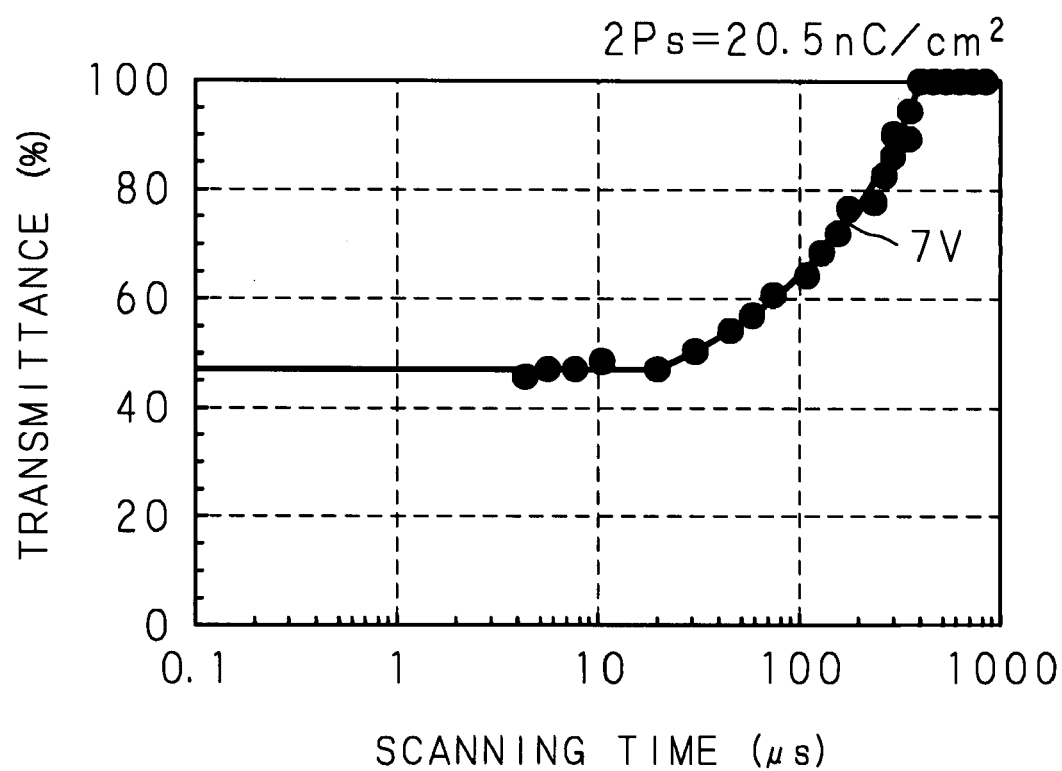
FIG. 3 is a graph showing a relation between the scanning time of each line and the transmittance in a liquid crystal display device.

FIG. 3 is a graph showing a relation between the scanning time of each line and the transmittance in the liquid crystal display device. A characteristic when the magnitude Ps of the spontaneous polarization per unit area of the liquid crystal material satisfies 2Ps=20.5 $nC/cm^2$ and the voltage applied to the liquid crystal is 7 V is shown in FIG. 3. When the scanning time of each line is equal to or less than 5 μs/line, stable driving can be performed with little electric field response of liquid crystal being caused within the scanning time.

The present invention will be concretely described with reference to the drawings showing embodiments thereof. The present invention is not limited to the embodiments shown below.

Figure 4:
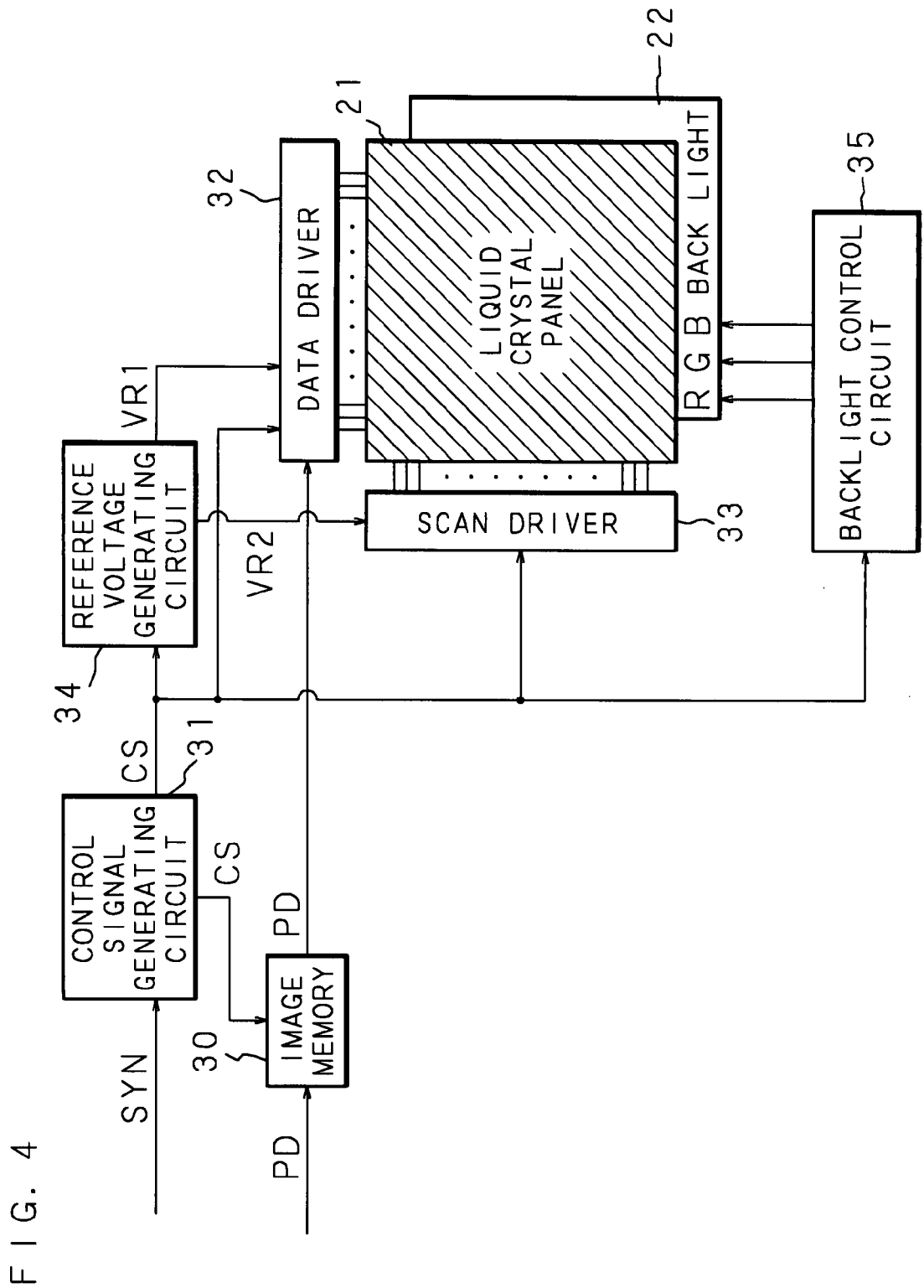
FIG. 4 is a block diagram showing the circuit arrangement of a liquid crystal display device of the present invention.
Figure 5:
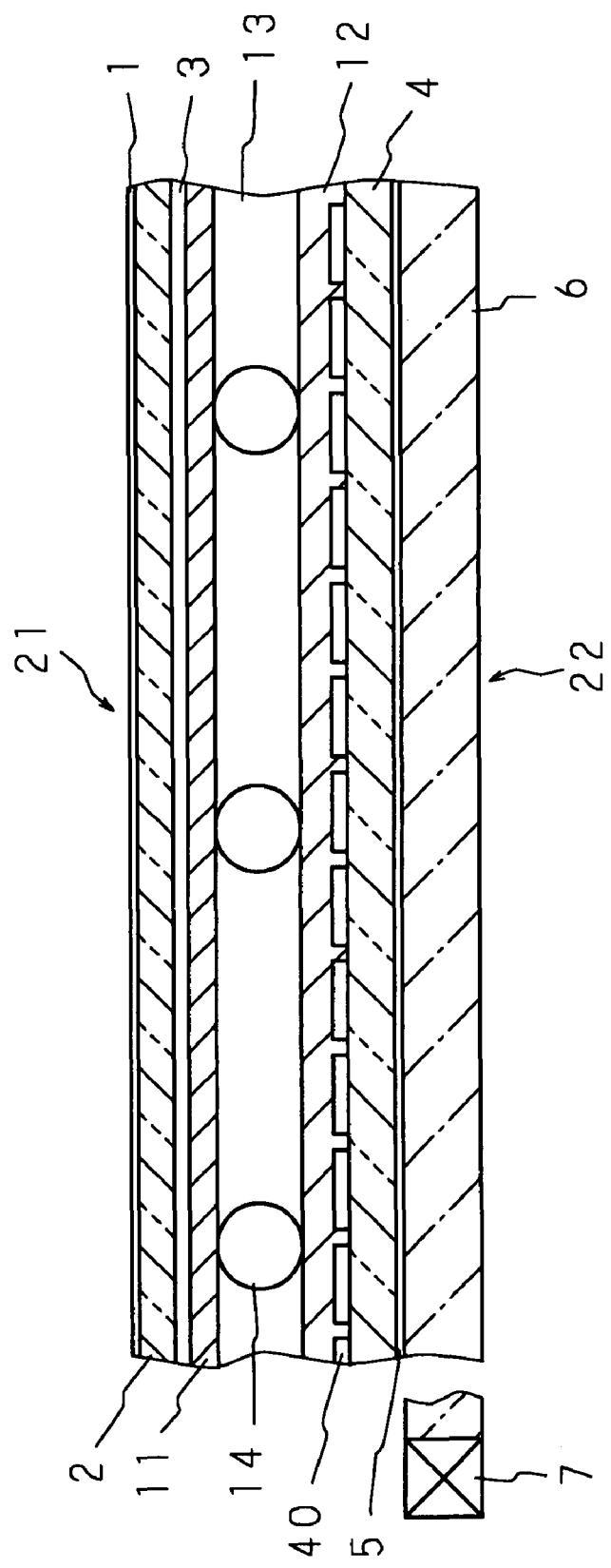
FIG. 5 is a schematic cross-sectional view of a liquid crystal panel and a backlight in a field sequential type liquid crystal display device.
Figure 6:
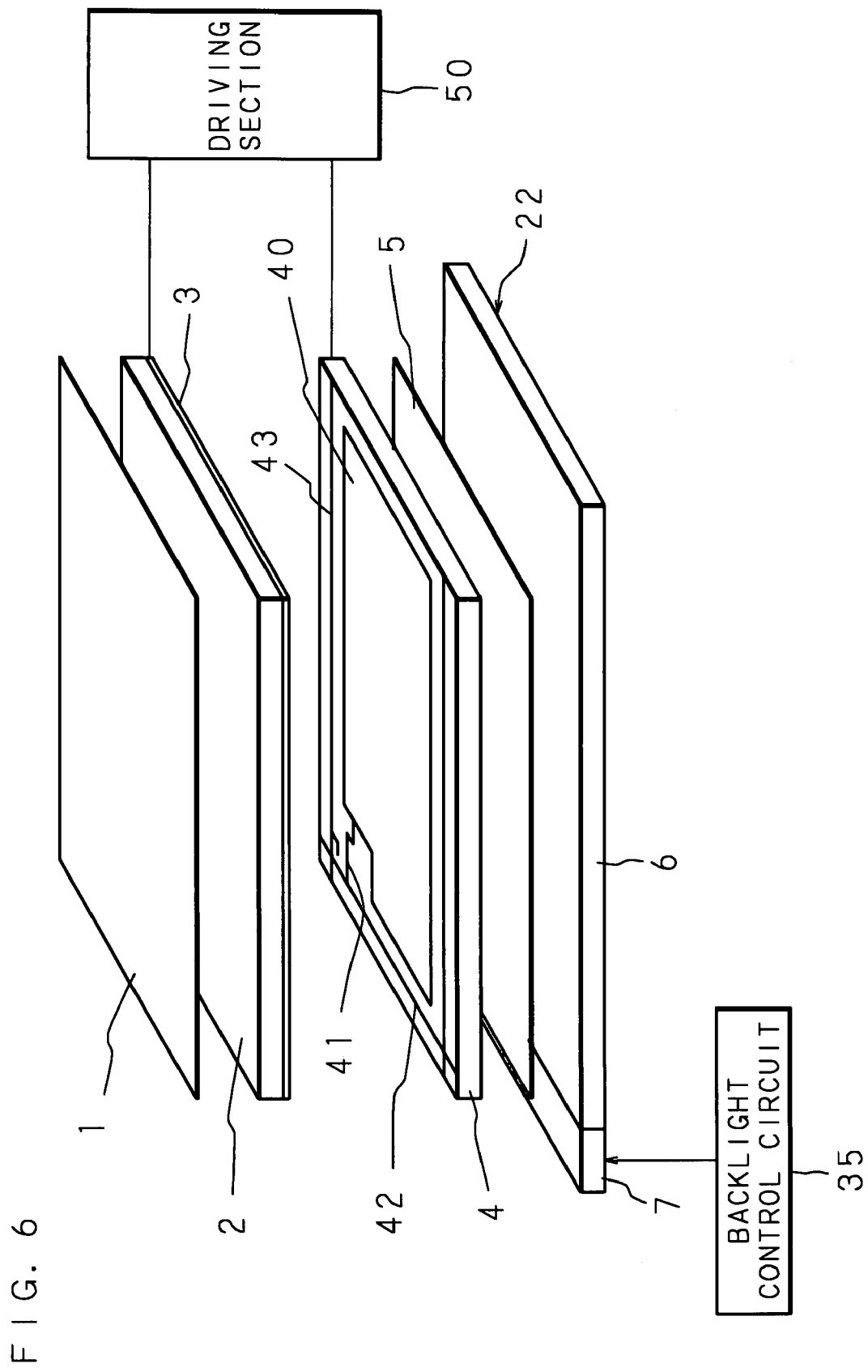
FIG. 6 is a schematic view showing an example of the overall structure of the liquid crystal display device.
Figure 7:
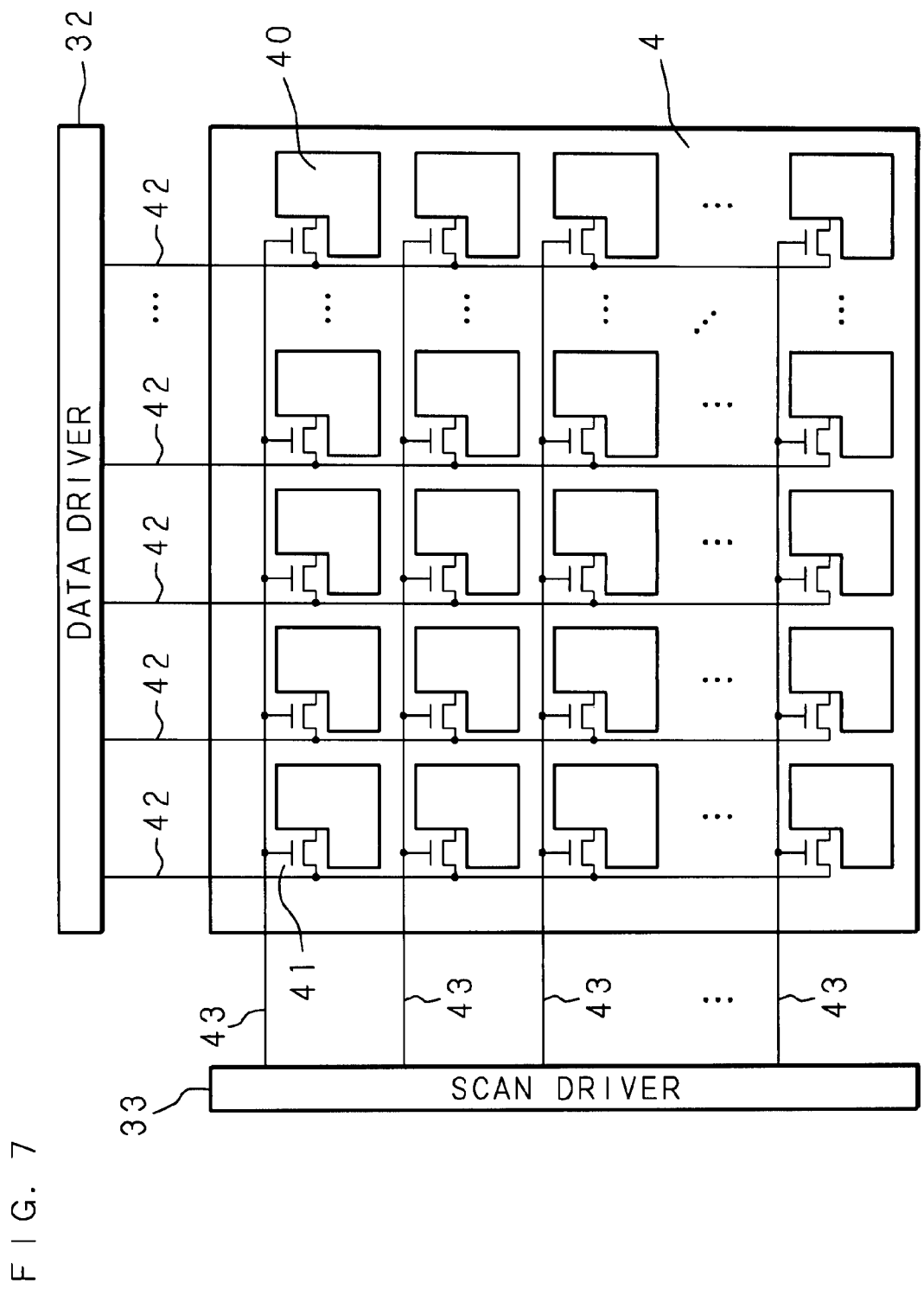
FIG. 7 is a schematic plan view of the liquid crystal panel of the present invention.

FIG. 4 is a block diagram showing the circuit arrangement of a liquid crystal display device of the present invention. FIG. 5 is a schematic cross-sectional view of a liquid crystal panel and a backlight. FIG. 6 is a schematic view showing an example of the overall structure of the liquid crystal display device. FIG. 7 is a schematic plan view of the liquid crystal panel of the present invention. FIG. 8 is a schematic view showing an example of the structure of an LED (laser emitting diode) array serving as the light source of the backlight.

In FIG. 4, reference numerals 21 and 22 represent the liquid crystal panel and the backlight the cross-sectional structures of which are shown in FIG. 5. As shown in FIG. 5, the backlight 22 includes an LED array 7 and a light directing and diffusing plate 6. As shown in FIGS. 5 and 6, the liquid crystal panel 21 includes a polarizer 1, a glass substrate 2, a common electrode 3, a glass substrate 4 and a polarizer 5 which are laminated in this order from the upper layer (front surface) side to the lower layer (back surface) side, and pixel electrodes 40 arranged in matrix are formed on the common electrode 3 side surface of the glass substrate 4.

An alignment film 12 is disposed on the upper surfaces of the pixel electrodes 40 on the glass substrate 4, and an alignment film 11, on the lower surface of the common electrode 3. A liquid crystal material is filled between the alignment films 11 and 12 to form a liquid crystal layer 13. Reference numeral 14 represents spacers for holding the thickness of the liquid crystal layer 13. A driving section 50 including a data driver 32 and a scan driver 33 is connected between the common electrode 3 and the pixel electrodes 40.

As shown in FIG. 7, the data driver 32 is connected to the source terminals of the TFTs 41 through signal lines 42, and the scan driver 33 is connected to the gate terminals of the TFTs 41 through scanning lines 43. The turning on and off of the TFTs 41 is controlled by the scan driver 33. The pixel electrodes 40 are respectively connected to the drain terminal of the TFT 41. Consequently, the transmitted light intensity of each pixel is controlled by the signal from the data driver 32 that is fed through the signal line 42 and the TFT 41. In the liquid crystal panel of the present invention, unlike the conventional example (see FIG. 1), no storage capacitor is provided, and the aperture ratio is higher than that of the conventional example in accordance with the nonprovision of a storage capacitor.

The backlight 22 is situated on the lower layer (back surface) side of the liquid crystal panel 21, and the LED array 7 is provided in a condition of facing an end surface of the light directing and diffusing plate 6 constituting a light emitting area. As shown in the schematic view of FIG. 8, the LED array 7 has a plurality of LEDs in which one chip is constituted by LED elements emitting light beams of three primary colors, that is, red (R), green (G) and blue (B), on the surface opposite to the light directing and diffusing plate 6. In the subframes of red, green and blue, the LED elements of red, green and blue are turned on, respectively. The light directing and diffusing plate 6 functions as the light emitting area by directing light from the LEDs of the LED array 7 to the entire area of its own surface and diffusing the light to the upper surface.

The liquid crystal panel 21 and the backlight 22 capable of time-division light emission of red, green and blue are placed one on another. The timing of turning on of the backlight 22 and the color of the emitted light are controlled in synchronism with the data writing scanning, based on the display data, on the liquid crystal panel 21.

In FIG. 4, reference numeral 31 represents a control signal generating circuit that is fed with a synchronization signal SYN from a personal computer and generates various control signals CS necessary for display. An image memory 30 outputs pixel data PD to the data driver 32. Based on the pixel data PD, and the control signal CS for changing the polarity of the applied voltage, a voltage is applied to the liquid crystal panel 21 through the data driver 32.

The control signal generating circuit 31 outputs the control signal CS to a reference voltage generating circuit 34, the data driver 32, the scan driver 33 and a backlight control circuit 35. The reference voltage generating circuit 34 generates reference voltages VR1 and VR2, and outputs the generated reference voltages VR1 and VR2 to the data driver 32 and the scan driver 33, respectively. The data driver 32 outputs a signal to the signal lines 42 of the pixel electrodes 40 based on the pixel data PD from the image memory 30 and the control signal CS from the control signal generating circuit 31. In synchronism with the output of this signal, the scan driver 33 sequentially scans the scanning lines 43 of the pixel electrodes 40 line by line. The backlight control circuit 35 feeds the backlight 22 with a driving voltage to cause the backlight 22 to emit red light, green light and blue light.

Next, the operation of the liquid crystal display device will be described. The pixel data PD for display is inputted from a personal computer to the image memory 30. The image memory 30 temporarily stores the pixel data PD, and then, outputs the pixel data PD when the control signal CS outputted from the control signal generating circuit 31 is accepted. The control signal CS generated by the control signal generating circuit 31 is fed to the data driver 32, the scan driver 33, the reference voltage generating circuit 34 and the backlight control circuit 35. The reference voltage generating circuit 34, when receiving the control signal CS, generates the reference voltages VR1 and VR2, and outputs the generated reference voltages VR1 and VR2 to the data driver 32 and the scan driver 33, respectively.

The data driver 32, when receiving the control signal CS, outputs a signal to the signal lines 42 of the pixel electrodes 40 based on the pixel data PD outputted from the image memory 30. The scan driver 33, when receiving the control signal CS, sequentially scans the scanning lines 43 of the pixel electrodes 40 line by line. The TFTs 41 are driven in accordance with the signal outputted from the data driver 32 and the scanning by the scan driver 33, a voltage is applied to the pixel electrodes 40, and the transmitted light intensity of the pixel is controlled. The backlight control circuit 35, when receiving the control signal CS, feeds the backlight 22 with a driving voltage to cause the LED elements of red, green and blue of the LED array 7 of the backlight 22 to emit light in a time-division manner so that red light, green light and blue light are sequentially emitted with time. In this manner, the control of turning on of each lighting area of the backlight 22 emitting light that is incident on the liquid crystal panel 21, and the data writing scanning on the liquid crystal panel 21 are synchronized with each other, thereby performing color display.

First Embodiment

After a TFT substrate having the pixel electrodes 40 (800× 480 pixels, 4 inches diagonally) without the provision of a storage capacitor and the glass substrate 2 having the common electrode 3 are cleaned, polyimide is applied thereto and baked at 200° C. for one hour to thereby form polyimide films of approximately 200 Å as the alignment films 11 and 12. Further, these alignment films 11 and 12 are rubbed with a rayon cloth, the two substrates are placed one on another so that the rubbing directions are parallel to each other, and the substrates are placed one on another with the gap therebetween being held by the spacers 14 made of silica with an average particle diameter of 1.8 μm, whereby an empty panel is formed. A ferroelectric liquid crystal material (for example, a material disclosed in A. Mochizuki et al., Ferroelectrics, 133, 353 [1991]) the main component of which is a naphthalene-based liquid crystal of the above-mentioned Sample 10 is sealed between the alignment films 11 and 12 of the empty panel to form the liquid crystal layer 13. The magnitude (Ps) of the spontaneous polarization of the ferroelectric liquid crystal material being sealed in, which is 10.25 nC/cm², and the capacity of liquid crystal (Clc), which is 3.0 nF/cm², satisfies the condition of |2Ps·A|≦|7Clc·A|. The formed panel is sandwiched between the two polarizers 1 and 5 in the crossed nicols state to form the liquid crystal panel 21, and setting is made so that the dark state is when the major axis direction of the ferroelectric liquid crystal molecules tilt in one way.

Figure 9:
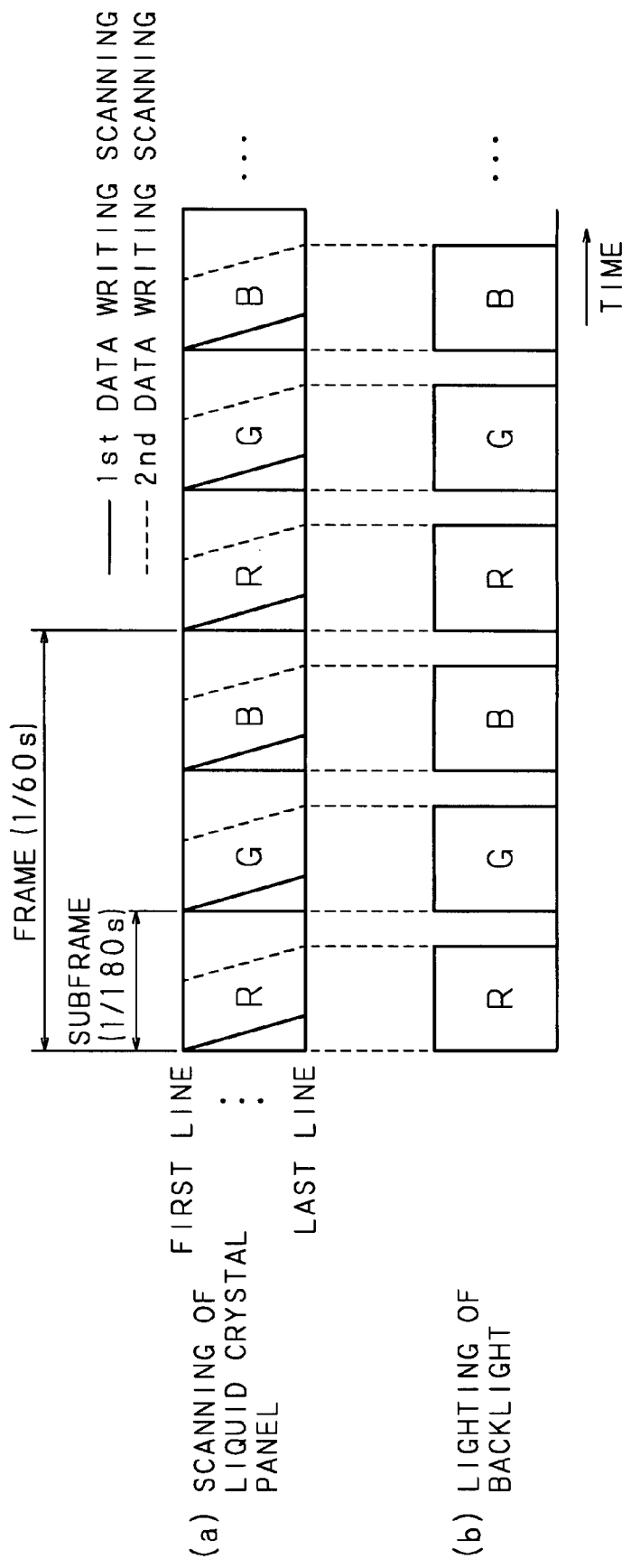
FIG. 9 is a view showing an example of the driving sequence in the field sequential type liquid crystal display device.

The liquid crystal panel 21 formed in this way and the backlight 22 the light source of which is the LED array 7 including twelve LEDs in which one chip is constituted by LED elements emitting light beams of red (R), green (G) and blue (B) are placed one on another, and color display by the field sequential method is performed in accordance with the driving sequence as shown in FIG. 9. FIG. 9(a) shows the scanning timing of each line of the liquid crystal panel 21. FIG. 9(b) shows the lighting timing of red, green and blue of the backlight 22.

One frame (period: 1/60 s) is divided into three subframes (period: 1/180 s) with the frame frequency being 60 Hz, and as shown in FIG. 9(a), for example, in the first subframe in one frame, writing scanning of red image data is performed twice, in the next second subframe, writing scanning of green image data is performed twice, and in the last third subframe, writing scanning of blue image data is performed twice. The maximum voltage applied to the liquid crystal is 7 V.

In the subframe, the time required for each data writing scanning is 25% (1/720 s) of that (1/180 s) of the subframe, and the scanning time of each line is equal to or less than 5 μs. In each subframe, in the first data writing scanning (first half), a voltage of a polarity where bright display is obtained is applied to the liquid crystal of each pixel in accordance with the display data, and in the second data writing scanning (latter half), a voltage that is dissimilar in polarity and equal in magnitude to that used in the first data writing scanning is applied to the liquid crystal of each pixel based on the display data the same as that used in the first data writing scanning. Consequently, in the second data writing scanning, dark display that can substantially be regarded as black image is obtained compared with the display obtained in the first data writing scanning.

The turning on of each of red, green and blue of the backlight 22 is controlled as shown in FIG. 9(b). In the first subframe, red light is emitted, in the second subframe, green light is emitted, and in the third subframe, blue light is emitted. The backlight 22 is not always on during the subframe, but the backlight 22 is turned on in synchronism with the start timing of the first data writing scanning, and turned off in synchronism with the end timing of the second data writing scanning.

As a result, high-resolution, rapid-response and high-color-purity display with a high transmittance can be realized.

Second Embodiment

A ferroelectric liquid crystal material (for example, a material disclosed in A. Mochizuki et al., Ferroelectrics, 133, 353 [1991]) the main component of which is a naphthalene-based liquid crystal of the above-mentioned Sample 9 is sealed between the alignment films 11 and 12 of the empty panel formed in the process similar to that of the first embodiment, thereby forming the liquid crystal layer 13. The magnitude (Ps) of the spontaneous polarization of the ferroelectric liquid crystal material being sealed in, which is 6.25 nC/cm², and the capacity of liquid crystal (Clc), which is 3.1 nF/cm², satisfies the condition of |2Ps·A|≦|4.5Clc·A|. The formed panel is sandwiched between the two polarizers 1 and 5 in the crossed nicols state to form the liquid crystal panel 21, and setting is made so that the dark state is when the major axis direction of the ferroelectric liquid crystal molecules tilt in one way.

The liquid crystal panel 21 formed in this way and the backlight 22 similar to that of the first embodiment are placed one on another, and color display by the field sequential method is performed in accordance with the driving sequence as shown in FIGS. 9(a) and (b) similar to that of the first embodiment. The maximum voltage applied to the liquid crystal is 7 V which is the same as that of the first embodiment.

As a result, high-resolution, rapid-response and high-color-purity display with a higher transmittance than that of the first embodiment can be realized.

Third Embodiment

A monostable ferroelectric liquid crystal material (for example, R2301 manufactured by Clariant Japan) is sealed between the alignment films 11 and 12 of the empty panel formed by the process similar to that of the first embodiment, thereby forming the liquid crystal layer 13. The magnitude (Ps) of the spontaneous polarization of the ferroelectric liquid crystal material being sealed in, which is 6 nC/cm$^2$, and the capacity of liquid crystal (Clc), which is 3 nF/cm$^2$, satisfies the condition of $|2Ps \cdot A| \leq |5Clc \cdot A|$. After the liquid crystal material is sealed in the panel, a voltage of 10 V is applied with the point of transition from the cholesteric phase to the chiral smectic C phase between, whereby a uniformly aligned state of the liquid crystal is realized. The formed panel is sandwiched between the two polarizers 1 and 5 in the crossed nicols state to form the liquid crystal panel 21, and setting is made so that the dark state is when no voltage is applied.

The liquid crystal panel 21 formed in this way and the backlight 22 similar to that of the first embodiment are placed one on another, and color display by the field sequential method is performed in accordance with the driving sequence as shown in FIGS. 9(*a*) and (*b*) similar to that of the first embodiment. The maximum voltage applied to the liquid crystal is 5 V.

As a result, high-resolution, rapid-response and high-color-purity display with a high transmittance can be realized.

Fourth Embodiment

A ferroelectric liquid crystal material (for example, a material disclosed in A. Mochizuki et al., Ferroelectrics, 133, 353 [1991]) the main component of which is a naphthalene-based liquid crystal of the above-mentioned Sample 3 is sealed between the alignment films 11 and 12 of the empty panel formed in the process similar to that of the first embodiment, thereby forming the liquid crystal layer 13. The magnitude (Ps) of the spontaneous polarization of the ferroelectric liquid crystal material being sealed in, which is 3.85 nC/cm$^2$, and the capacity of liquid crystal (Clc), which is 2.9 nF/cm$^2$, satisfies the condition of $|2Ps \cdot A| \leq |3Clc \cdot A|$. The formed panel is sandwiched between the two polarizers 1 and 5 in the crossed nicols state to form the liquid crystal panel 21, and setting is made so that the dark state is when the major axis direction of the ferroelectric liquid crystal molecules tilt in one way.

The liquid crystal panel 21 formed in this way and the backlight 22 similar to that of the first embodiment are placed one on another, and color display by the field sequential method is performed in accordance with the driving sequence as shown in FIGS. 9(*a*) and (*b*) similar to that of the first embodiment. The maximum voltage applied to the liquid crystal is 5 V which is the same as that of the third embodiment.

As a result, high-resolution, rapid-response and high-color-purity display with a higher transmittance than that of the third embodiment can be realized.

While the field sequential type liquid crystal display devices are described as examples in the above-described embodiments, similar effects are obtained in color filter type liquid crystal display devices having color filters.

Figure 10:
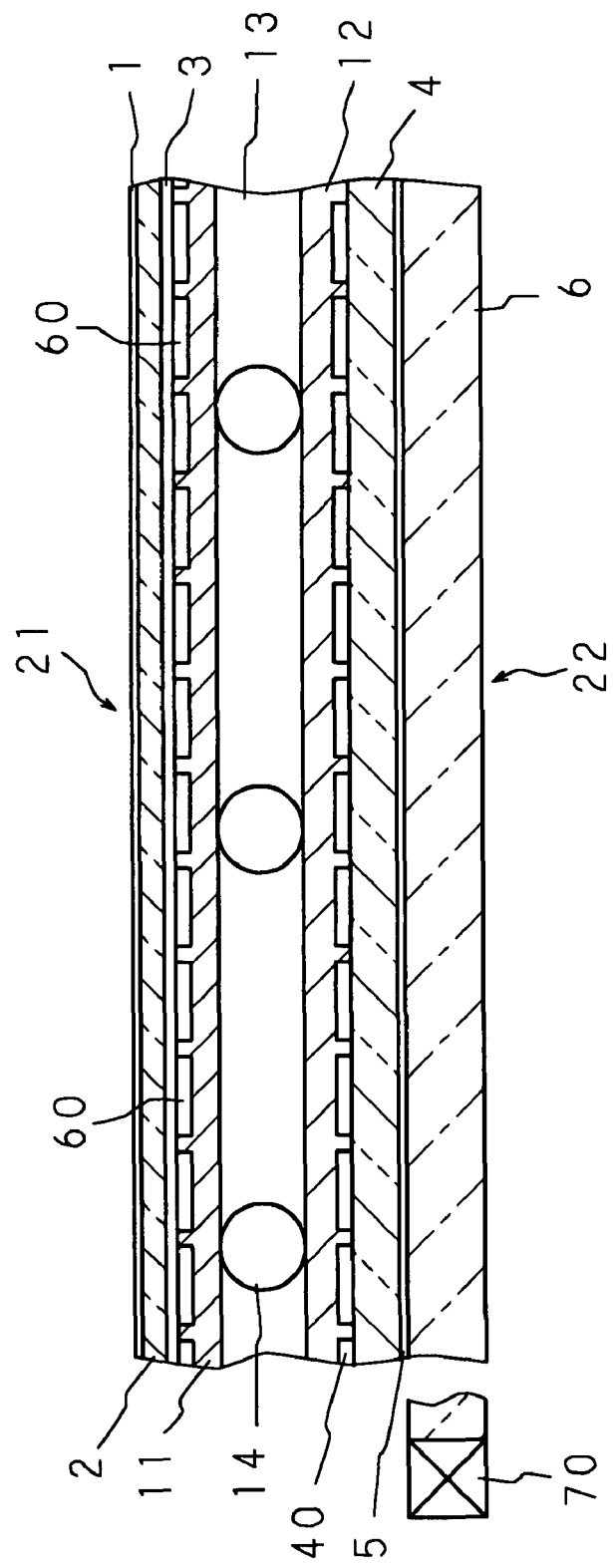
FIG. 10 is a schematic cross-sectional view of a liquid crystal panel and a backlight in a color filter type liquid crystal display device.

FIG. 10 is a schematic cross-sectional view of a liquid crystal panel and a backlight in a color filter type liquid crystal display device. In FIG. 10, the same parts as those of FIG. 5 are denoted by the same reference numerals, and descriptions thereof are omitted. The common electrode 3 is provided with color filters 60 of three primary colors (R, G and B). The backlight 22 includes a white light source 70 having a plurality of white light source elements that emit white light, and the light directing and diffusing plate 6. In such a color filter type liquid crystal display device, the white light from the white light source 70 is selectively transmitted by the color filters 60 of a plurality of colors to thereby perform color display.

By performing color display in accordance with the driving sequence as shown in FIGS. 11(*a*) and (*b*), even in the color filter type liquid crystal display device, a sufficiently high transmittance can be realized and excellent display can be realized without the provision of a storage capacitor as in the above-described field sequential type liquid crystal display devices.

While cases where the ferroelectric liquid crystal materials having spontaneous polarization are used are described in the above-described embodiments, similar effects are obtained when other liquid crystal materials having spontaneous polarization such as anti-ferroelectric liquid crystal materials are used. The present invention is not limited to transmissive type liquid crystal display devices. The present invention is also applicable to reflective type liquid crystal display devices and front/rear projectors.

With respect to embodiments including the above-described embodiments, the following additions are further disclosed:

(Addition 1)

An active matrix driven liquid crystal display device having a liquid crystal cell in which a liquid crystal material having spontaneous polarization is sealed, wherein a magnitude Ps (nC/cm$^2$) of the spontaneous polarization per unit area of the liquid crystal material satisfies a condition of $|2Ps \cdot A| \leq |k \cdot Clc \cdot A|$, and no storage capacitor is provided, where A (cm$^2$) is an electrode area of a pixel, Clc (nF/cm$^2$) is a capacity of liquid crystal per unit area, and k is a positive constant that is set in accordance with a voltage applied to the liquid crystal cell.

(Addition 2)

An active matrix driven liquid crystal display device having a liquid crystal cell in which a liquid crystal material having spontaneous polarization is sealed, wherein a magnitude Ps (nC/cm$^2$) of the spontaneous polarization per unit area of the liquid crystal material satisfies a condition of $|2Ps \cdot A| \leq |7Clc \cdot A|$, and no storage capacitor is provided, where A (cm$^2$) is an electrode area of a pixel, and Clc (nF/cm$^2$) is a capacity of liquid crystal per unit area.

(Addition 3)

The liquid crystal display device according to Addition 2, wherein the magnitude Ps of the spontaneous polarization per unit area of the liquid crystal material is equal to or less than 11 nC/cm$^2$.

(Addition 4)

The liquid crystal display device according to Addition 2, wherein the magnitude Ps (nC/cm$^2$) of the spontaneous polarization per unit area of the liquid crystal material satisfies a condition of $|2Ps \cdot A| \leq |4.5Clc \cdot A|$.

(Addition 5)

The liquid crystal display device according to Addition 4, wherein the magnitude Ps of the spontaneous polarization per unit area of the liquid crystal material is equal to or less than 7 nC/cm$^2$.

(Addition 6)

An active matrix driven liquid crystal display device having a liquid crystal cell in which a liquid crystal material having spontaneous polarization is sealed, wherein a magnitude Ps (nC/cm$^2$) of the spontaneous polarization per unit area of the liquid crystal material satisfies a condition of $|2Ps \cdot A| \leq |5Clc \cdot A|$, and no storage capacitor is provided, where A (cm$^2$) is an electrode area of a pixel, and Clc (nF/cm$^2$) is a capacity of liquid crystal per unit area.

(Addition 7)

The liquid crystal display device according to Addition 6, wherein the magnitude Ps of the spontaneous polarization per unit area of the liquid crystal material is equal to or less than 8 nC/cm$^2$.

(Addition 8)

The liquid crystal display device according to Addition 6, wherein the magnitude Ps (nC/cm$^2$) of the spontaneous polarization per unit area of the liquid crystal material satisfies a condition of $|2Ps \cdot A| \leq |3Clc \cdot A|$.

(Addition 9)

The liquid crystal display device according to Addition 8, wherein the magnitude Ps of the spontaneous polarization per unit area of the liquid crystal material is equal to or less than 4.5 nC/cm$^2$.

(Addition 10)

The liquid crystal display device according to any one of Additions 1 to 9, wherein a scanning time of each line in data writing scanning is a time during which the liquid crystal hardly makes a response and a change in transmittance hardly occurs.

(Addition 11)

The liquid crystal display device according to Addition 10, wherein the scanning time of each line is equal to or less than 5 μs/line.

(Addition 12)

The liquid crystal display device according to any one of Additions 1 to 11, wherein color display is performed by a field sequential method.

(Addition 13)

The liquid crystal display device according to any one of Additions 1 to 11, wherein color display is performed by a color filter method.

(Addition 14)

The liquid crystal display device according to any one of Additions 1 to 13, wherein a light source for display is a light emitting diode.

(Addition 15)

An active matrix driven liquid crystal display device having a liquid crystal cell in which a liquid crystal material having spontaneous polarization is sealed, wherein a magnitude Ps (nC/cm$^2$) of the spontaneous polarization per unit area of the liquid crystal material satisfies a condition of $|2Ps \cdot A| \leq |k \cdot Clc \cdot A|$, and no storage capacitor is provided, where A (cm$^2$) is an electrode area of a pixel, Clc (nF/cm$^2$) is a capacity of liquid crystal per unit area, and k is a magnitude of a voltage applied to the liquid crystal cell.

(Addition 16)

The liquid crystal display device according to Addition 15, wherein when the magnitude of the voltage applied to the liquid crystal cell is 7 V, the magnitude Ps of the spontaneous polarization per unit area of the liquid crystal material is equal to or less than approximately 11 nC/cm$^2$.

(Addition 17)

The liquid crystal display device according to Addition 15, wherein when the magnitude of the voltage applied to the liquid crystal cell is 5 V, the magnitude Ps of the spontaneous polarization per unit area of the liquid crystal material is equal to or less than approximately 8 nC/cm$^2$.

(Addition 18)

An active matrix driven liquid crystal display device having a liquid crystal cell in which a liquid crystal material having spontaneous polarization is sealed, wherein a magnitude Ps (nC/cm$^2$) of the spontaneous polarization per unit area of the liquid crystal material satisfies a condition of $|2Ps \cdot A| \leq |0.6 \cdot k \cdot Clc \cdot A|$, and no storage capacitor is provided, where A (cm$^2$) is an electrode area of a pixel, Clc (nF/cm$^2$) is a capacity of liquid crystal per unit area, and k is a magnitude of a voltage applied to the liquid crystal cell.

(Addition 19)

The liquid crystal display device according to Addition 18, wherein when the magnitude of the voltage applied to the liquid crystal cell is 7 V, the magnitude Ps of the spontaneous polarization per unit area of the liquid crystal material is equal to or less than approximately 7 nC/cm$^2$.

(Addition 20)

The liquid crystal display device according to Addition 18, wherein when the magnitude of the voltage applied to the liquid crystal cell is 5 V, the magnitude Ps of the spontaneous polarization per unit area of the liquid crystal material is equal to or less than approximately 4.5 nC/cm$^2$.

(Addition 21)

The liquid crystal display device according to any one of Additions 15 to 20, wherein a scanning time of each line in data writing scanning is a time during which the liquid crystal hardly makes a response and a change in transmittance hardly occurs.

(Addition 22)

The liquid crystal display device according to Addition 21, wherein the scanning time of each line is equal to or less than 5 μs/line.

What is claimed is:

1. An active matrix driven liquid crystal display device, comprising:

a liquid crystal cell in which a liquid crystal material having spontaneous polarization is sealed;

wherein a magnitude Ps (nC/cm$^2$) of the spontaneous polarization per unit area of the liquid crystal material satisfies a condition of $|2Ps \cdot A| \leq |k \cdot Clc \cdot A|$, and no storage capacitor is provided, where A (cm$^2$) is an electrode area of a pixel, Clc (nF/cm$^2$) is a capacity of liquid crystal per unit area, and k is a positive constant that is set in accordance with a voltage applied to the liquid crystal cell.

2. The liquid crystal display device according to claim 1, wherein a scanning time of each line in data writing scanning is a time during which the liquid crystal hardly makes a response and a change in transmittance hardly occurs.

3. The liquid crystal display device according to claim 2, wherein the scanning time of each line is equal to or less than 5 μs/line.

4. The liquid crystal display device according to claim 1, wherein color display is performed by a field sequential method.

5. The liquid crystal display device according to claim 1, wherein color display is performed by a color filter method.

6. The liquid crystal display device according to claim 1, wherein a light source for display is a light emitting diode.

7. An active matrix driven liquid crystal display device, comprising:

a liquid crystal cell in which a liquid crystal material having spontaneous polarization is sealed;

wherein a magnitude Ps (nC/cm$^2$) of the spontaneous polarization per unit area of the liquid crystal material satisfies a condition of $|2Ps \cdot A| \leq |7Clc \cdot A|$, and no storage capacitor is provided, where A (cm$^2$) is an electrode area of a pixel, and Clc (nF/cm$^2$) is a capacity of liquid crystal per unit area.

8. The liquid crystal display device according to claim 7, wherein the magnitude Ps of the spontaneous polarization per unit area of the liquid crystal material is equal to or less than 11 nC/cm$^2$.

9. The liquid crystal display device according to claim 7, wherein the magnitude Ps (nC/cm$^2$) of the spontaneous polarization per unit area of the liquid crystal material satisfies a condition of $|2Ps \cdot A| \leq |4.5Clc \cdot A|$.

10. The liquid crystal display device according to claim 9, wherein the magnitude Ps of the spontaneous polarization per unit area of the liquid crystal material is equal to or less than 7 nC/cm$^2$.

11. An active matrix driven liquid crystal display device, comprising:

a liquid crystal cell in which a liquid crystal material having spontaneous polarization is sealed;

wherein a magnitude Ps (nC/cm$^2$) of the spontaneous polarization per unit area of the liquid crystal material satisfies a condition of $|2Ps \cdot A| \leq |5Clc \cdot A|$, and no storage capacitor is provided, where A (cm$^2$) is an electrode area of a pixel, and Clc (nF/cm$^2$) is a capacity of liquid crystal per unit area.

12. The liquid crystal display device according to claim 11, wherein the magnitude Ps of the spontaneous polarization per unit area of the liquid crystal material is equal to or less than 8 nC/cm$^2$.

13. The liquid crystal display device according to claim 11, wherein the magnitude Ps (nC/cm$^2$) of the spontaneous polarization per unit area of the liquid crystal material satisfies a condition of $|2Ps \cdot A| \leq |3Clc \cdot A|$.

14. The liquid crystal display device according to claim 12, wherein the magnitude Ps of the spontaneous polarization per unit area of the liquid crystal material is equal to or less than 4.5 nC/cm$^2$.

15. An active matrix driven liquid crystal display device, comprising:

a liquid crystal cell in which a liquid crystal material having spontaneous polarization is sealed;

wherein a magnitude Ps (nC/cm$^2$) of the spontaneous polarization per unit area of the liquid crystal material satisfies a condition of $|2Ps \cdot A| \leq |k \cdot Clc \cdot A|$, and no storage capacitor is provided, where A (cm$^2$) is an electrode area of a pixel, Clc (nF/cm$^2$) is a capacity of liquid crystal per unit area, and k is a magnitude of a voltage applied to the liquid crystal cell.

16. The liquid crystal display device according to claim 15, wherein when the magnitude of the voltage applied to the liquid crystal cell is 7 V, the magnitude Ps of the spontaneous polarization per unit area of the liquid crystal material is equal to or less than approximately 11 nC/cm$^2$.

17. The liquid crystal display device according to claim 15, wherein when the magnitude of the voltage applied to the liquid crystal cell is 5 V, the magnitude Ps of the spontaneous polarization per unit area of the liquid crystal material is equal to or less than approximately 8 nC/cm$^2$.

18. The liquid crystal display device according to claim 15, wherein a scanning time of each line in data writing scanning is a time during which the liquid crystal hardly makes a response and a change in transmittance hardly occurs.

19. The liquid crystal display device according to claim 18, wherein the scanning time of each line is equal to or less than 5 μs/line.

20. An active matrix driven liquid crystal display device, comprising:

a liquid crystal cell in which a liquid crystal material having spontaneous polarization is sealed;

wherein a magnitude Ps (nC/cm$^2$) of the spontaneous polarization per unit area of the liquid crystal material satisfies a condition of $|2Ps \cdot A| \leq |0.6 \cdot k \cdot Clc \cdot A|$, and no storage capacitor is provided, where A (cm$^2$) is an electrode area of a pixel, Clc (nF/cm$^2$) is a capacity of liquid crystal per unit area, and k is a magnitude of a voltage applied to the liquid crystal cell.

21. The liquid crystal display device according to claim 20, wherein when the magnitude of the voltage applied to the liquid crystal cell is 7 V, the magnitude Ps of the spontaneous polarization per unit area of the liquid crystal material is equal to or less than approximately 7 nC/cm$^2$.

22. The liquid crystal display device according to claim 20, wherein when the magnitude of the voltage applied to the liquid crystal cell is 5 V, the magnitude Ps of the spontaneous polarization per unit area of the liquid crystal material is equal to or less than approximately 4.5 nC/cm$^2$.

* * * * *